United States Patent [19]

Ihlein et al.

[11] Patent Number: 4,636,556
[45] Date of Patent: Jan. 13, 1987

[54] HEAT-HARDENING REACTION RESIN MIXTURE FOR IMPREGNATING INSULATION OF ELECTRICAL EQUIPMENT AND FOR THE MANUFACTURE OF MOLDING MATERIALS WITH AND WITHOUT INSERTS

[75] Inventors: Walter Ihlein, Berlin; Wolfgang Rogler, Mohrendorf, both of Fed. Rep. of Germany

[73] Assignee: Siemens Aktiengesellschaft, Munich, Fed. Rep. of Germany

[21] Appl. No.: 774,310

[22] Filed: Sep. 10, 1985

[30] Foreign Application Priority Data

Sep. 14, 1984 [DE] Fed. Rep. of Germany ....... 3434270

[51] Int. Cl.$^4$ .................... C08G 18/18; C08G 18/30; C08G 18/58; C08F 283/04
[52] U.S. Cl. .................................. 528/53; 525/455; 528/48; 528/73
[58] Field of Search ............................ 528/48, 73, 53; 525/455

[56] References Cited

U.S. PATENT DOCUMENTS

| 3,793,247 | 2/1974 | Fleming et al. | 528/91 |
| 3,836,492 | 9/1974 | Watanabe et al. | 525/455 |
| 4,022,721 | 5/1977 | Ashida | 528/53 |
| 4,128,531 | 12/1978 | Toyoda et al. | 528/53 |
| 4,162,357 | 7/1979 | Kubens et al. | 528/67 |
| 4,220,731 | 9/1980 | Zuppinger | 528/73 |
| 4,224,422 | 9/1980 | Rude et al. | 525/454 |
| 4,225,460 | 9/1980 | Newell | 528/73 |

FOREIGN PATENT DOCUMENTS

| 0035072 | 9/1981 | European Pat. Off. . |
| 2308802 | 9/1973 | Fed. Rep. of Germany . |
| 2432952 | 1/1975 | Fed. Rep. of Germany . |
| 2722400 | 11/1978 | Fed. Rep. of Germany . |
| 2655367 | 4/1981 | Fed. Rep. of Germany . |

Primary Examiner—Herbert S. Cockeram
Attorney, Agent, or Firm—Kenyon & Kenyon

[57] ABSTRACT

A heat-hardenable reaction resin mixture including a polyisocyanate; a polyepoxy resin and an olefinically unsaturated compound having no active hydrogen atoms. Addition complexes of tertiary amines and boron trichloride having the general formula $BCl_3.NR_1R_2R_3$ are used as accelerators. Polymerizate inhibitors may also be added. The mixture is very storage-stable and hardens in short times (quickly) at elevated temperatures. The molding materials obtained in this manner are highly resistant to thermal aging.

10 Claims, No Drawings

HEAT-HARDENING REACTION RESIN MIXTURE FOR IMPREGNATING INSULATION OF ELECTRICAL EQUIPMENT AND FOR THE MANUFACTURE OF MOLDING MATERIALS WITH AND WITHOUT INSERTS

FIELD OF THE INVENTION

The invention relates to a heat-hardenable reaction resin mixture for impregnating the insulation of electrical equipment, formed by insulating sleeves on electrical conductors made from foil or tape-shaped insulating materials having high heat resistance, especially the insulation on the winding bars or coils in electric machines and also useful for the manufacture of molding materials with or without inserts. The resin mixture comprises polyisocyanates and (poly) epoxide resins, including at least one olefinically unsaturated compound having no active hydrogen atoms, and including an accelerator (catalyst) system.

BACKGROUND OF THE INVENTION

Heat-hardenable reaction resin mixtures are disclosed by British Pat. Nos. 1,585,339, 1,474,371; and 1,421,460, and German Pat. Nos. DE-OS 27 22 400, DE-OS 24 32 952 and DE-OS 23 08 802. These known mixtures of polyisocyanates/epoxide resins and unsaturated olefinic compounds, produce molding materials having high thermal dimensional stability, long-term heat resistance and good mechanical and electrical properties when cross-linked in the presence of certain accelerator systems. The use of these known mixtures has not been entirely successful due to technical difficulties associated with the accelerators or accelerator systems described in the above-named publications which cause the mixtures to harden either too slow or too fast. Thus, it has not been possible, for example, to economically produce insulations with known mixtures of polyisocyanate, epoxy resin and olefinically unsaturated compounds and accelerator systems because the viscosity of these mixtures either increases too fast interfering with complete impregnation or, too slow, so that hardening in an economically feasible time does not take place.

SUMMARY OF THE INVENTION

In order to solve the foregoing problems, addition complexes of tertiary amines and boron trichlorides having the general formula

$$BCl_3 \cdot NR_1R_2R_3$$

are used according to the invention as accelerator systems in a heat-hardenable reaction resin mixture useful for impregnating electrical conductors of the type mentioned above and for manufacturing molding materials with or without inserts. The heat hardenable resin mixture of the invention comprises a polyisocyanate, a polyepoxide and at least one olefinically unsaturated compound having no active hydrogen atoms, and the accelerator system wherein $R_1$, $R_2$ and $R_3$ are the same or different aliphatic, aromatic, heterocyclic or aryl-aliphatic radicals; and where $R_2$ and $R_3$ may also be bound to each other as well as to the tertiary amine nitrogen atom. The tertiary nitrogen atom may also be incorporated into a ring system which may contain multiple bonds and may have an aromatic character, thus $R_1$, $R_2$, $R_3$ are combined to a trivalent organic radical which is bound to the nitrogen via a simple-C and a double-C bond.

DETAILED DESCRIPTION OF THE INVENTION

In a reaction resin mixture of polyisocyanate/polyepoxide resin and at least one olefinically unsaturated compound having no active hydrogen atoms the accelerator systems of this invention exhibit a pronounced latency, i.e., the reaction resin mixture including accelerator can be stored at room temperature for weeks without a substantial increase in their viscosity values.

With a resin mixture having a combination of components in accordance with the present invention, impregnation of the insulation may be carried out at room temperature and good penetration of the insulation is assured. Likewise, molded bodies with or without inserts can be cast at room temperature.

Incipient gelling of the penetrated reaction resin system takes place at temperatures of about 70° to 140° C. in a short period of time as indicated by the data appearing in Table 1 which is set forth below. Gelling may be effected either outside the impregnating bath or inside the same by means of electric heating and complete in-bath hardening by means of electric heating is also conceivable. Gelling minimizes running, dripping and other undeirable movement of the resin mixture prior to hardening. Thus, impregnated or cast objects can be brought to final hardening in ovens in any desired position without danger of the penetrated reaction resin mixture flowing out of the object. In the hardened condition, this reaction resin mixture produces an insulation or molding material of high dimensional heat resistance and high long-term thermal resistance, which are useful properties at the high operating temperatures typically experienced by such insulation.

Addition of a conventional polymerization inhibitor such as quinhydrone, hydroquinone and/or hydroquinonemonomethyl ether, can further increase the storage stability of the mixtures without appreciable lengthening of the gelling times of the resin mixture at elevated temperatures.

Although the latent accelerator action of boron trichloride adducts ($BCl_3$-adducts) similar to those of the corresponding boron fluoride adducts ($BF_3$-adducts) in epoxy resins or epoxy resin hardener systems, as well as, the latent accelerator action of the $BCl_3$-adducts for isocyanate epoxy systems are known (German Pat. No. 26 55 367), it is not obvious that the $BCl_3$-amine complexes are also suitable accelerators for mixtures of polyisocyanate(poly)-epoxy resins and an olefinically unsaturated compound having no active hydrogen atoms, or that the latent action is even more pronounced in such mixtures. This is even more surprising since the corresponding $BF_3$-amine complexes do not exhibit this property in mixtures of polyisocyanat(poly)-epoxy resins and olefinically unsaturated compounds having no active hydrogen and such accelerators must be classified in the group of conventional aminic accelerators.

Surprisingly, the long-term heat resistance of the mixtures of this invention is further increased by the addition of the olefinically unsaturated compounds having no active hydrogen atoms so that higher operating temperatures for the insulating and molding material produced from the reaction resin mixture of this invention are possible.

High storage stability of the reaction resin mixture is achieved if about 0.01 to 5.00 percent by weight of accelerator is included in a mixture of polyisocyanate(-poly)-epoxy and olefinically unsaturated compounds having no active hydrogen.

The (optional) polymerization inhibitor may be added in amounts of about 0.0001 to 2 percent by weight preferably 0.0005 to 0.5000 percent by weight. More preferably, about 0.05 to 2.50 percent by weight accelerator and 0.01 to 0.05 percent by weight inhibitor are employed in order to achieve trouble-free gelling at elevated temperatures.

In order to minimize thermal aging of insulation impregnated with the reaction resin mixture according to the invention, it is advisable to keep the content of the (poly)epoxy compound in the reaction resin mixture lower than the content of the olefinically unsaturated compound having no active hydrogen atoms. It is also advantageous if the polyisocyanate compounds used are liquid at room temperature because these are easier to handle in room temperature impregnations. Suitable for this purpose are polyisocyanate mixtures of diphenylmethanediisocyanate or toluylenediisocyanate or isophoronediisocyanate.

The purity of compounds used in the reaction resin mixture must always be considered because impurities may prematurely catalyze the gelling and hardening reactions. Such catalysis must be effected only by the accelerator system disclosed herein to achieve the enhanced stability associated with this invention.

Examples of epoxides useful in the practice of this invention are bisphenol-A-diglycidyl ether, bisphenol-F-diglycidyl ether, resorcin-diglycidyl ether, the known cycloaliphatic epoxides, for instance, 3,4-epoxycyclohexylmethyl-3,4-epoxy cyclohexane carboxylate, as well as, heterocyclic epoxy compounds based on hydantoine, as well as, monofunctional epoxies such as phenylglycidyl ether, 0-cresylglycidyl ether, glycidyl ether, etc. Additional examples of useful epoxides are listed in the "Handbook of Epoxy Resin" by H. Lee and K. Neville, (McGraw-Hill Book Company, 1967). Particularly advantageous is the use of very high-purity bisphenol-A-diglycidyl ether or very high-purity bisphenol-F-diglycidyl ether.

The preferable olefinically unsaturated compounds are those which have no hydrogen atoms reactive with the isocyanate (NCO) groups of the polyisocyanate, for example, styrene, $C_1$–$C_4$ alkylstyrenes, methacrylic acid $C_1$–$C_8$ alkyl esters, diallylphthalate, di-or trimethacrylic acid esters. Any desired mixtures of these compounds can also be used. Preferably, styrene and/or (meth)acrylic acid alkyl esters are used.

The addition complexes of tertiary amines and boron trichloride useful as accelerator systems according to the invention may further exhibit secondary properties which dictate the choice of the one such compound over another under specific conditions. Preferred accelerators are addition complexes of boron trichloride with tertiary amines, in which $R_1$ and $R_2$ consist of identical radicals preferably methyl groups and $R_3$ is an alkyl, aralkyl, aryl or a heterocyclic radical. Also complexes of pyridine or 1-substituted imidazols are used. Addition complexes of boron trichloride with dimethyloctylamine have the advantage that they are readily soluble in the claimed mixtures. While the addition complexes of boron trichloride with benzyldimethylamine are somewhat more difficult to dissolve, their solutions exhibit higher storage stability at room temperature and the complex as such is also less hydrolysis-sensitive. NH— and OH— group-containing accelerator systems are less desirable because they form relatively chemically unstable urea and urethane structures and therefore greater thermal aging is to be expected.

Polymerization inhibitors which cause a further increase of the storage life of the claimed reaction resin mixture are conventional polymerization inhibitor systems such as quinhydrone, hydroquinone, hydroquinone-monomethyl ether, nitrobenzene, dinitrobenzene, dinitrochlorobenzene and other compounds which prevent the free-radical polymerization of the olefinically unsaturated compound having no active hydrogen atoms.

The reaction resin mixtures according to the invention may also contain inorganic mineral fillers for the manufacture of molding materials. Customary fillers are, for instance, quartz meal, aluminum oxide or chalk.

The invention will be explained in further detail in the following examples:

EXAMPLE 1

First, the storage stability of an accelerated reaction resin mixture was investigated. The components of this reaction resin mixture were: 100 g of a very high-purity isomer mixture of diphenylmethanediisocyanate, 25 g styrene (dried on a molecular sieve), 6.6 g of very high-purity bisphenol-A-diglycidyl ether with an epoxy number of 0.58.

Test No. 1, in Table 1 shows the course of changes in the viscosity of this resin mixture at room temperature over 4 weeks.

EXAMPLE 2

To the mixture mentioned in Example 1, the following accelerator or accelerator/inhibitor systems are added:

Test No. 2: 0.4 g $BCl_3$-dimethylbenzylamine
Test No. 3: 0.4 g $BCl_3$-dimethylbenzylamine + 0.015 g quinohydrone
Test No. 4: 0.4 g $BCl_3$-dimethyloctylamine
Test No. 5: 0.4 g $BCl_3$-dimethyloctylamine + 0.015 g quinhydrone
Test No. 6: 0.2 g dimethylbenzylamine
Test No. 7: 0.3 g $BF_3$-benzyldimethylamine

TABLE 1

| Test no. | Initial value | Viscosity in mPas after storage At room temperature (measuring temperature 23.5° C.) ||||| Gelling time (min) At ||
|---|---|---|---|---|---|---|---|---|
| | | 1 week | 2 weeks | 3 weeks | 4 weeks | 5 weeks | 110° C. | 130° C. |
| 1 | 5.3 | — | — | 8.5 | 10 | — | — | — |
| 2 | 7.2 | — | — | 77.8 | 128.4 | — | 113 | 105 |
| 3 | 5.3 | — | — | 10.0 | 49.2 | — | 105 | 98 |
| 4 | 7.2 | — | — | 14.6 | 300 | — | 30 | 26 |
| 5 | 5.3 | — | — | 39.4 | 100 | — | 28 | 23 |
| 6 | 5.3 | gelled | — | — | — | — | 23 | — |

TABLE 1-continued

| Test no. | Initial value | Viscosity in mPas after storage At room temperature (measuring temperature 23.5° C.) | | | | | Gelling time (min) At | |
|---|---|---|---|---|---|---|---|---|
| | | 1 week | 2 weeks | 3 weeks | 4 weeks | 5 weeks | 110° C. | 130° C. |
| 7 | 6.0 | after 1 day gelled after about 2 days | — | — | — | — | 100 | 90 |

Changes in the viscosity of these reaction resin mixtures (1–7) were periodically measured after storage in closed vessels. Storage and measurement took place at room temperature. From Table 1, advantages of the accelerator systems according to the invention over the accelerators in Tests 6 and 7 can be seen clearly.

EXAMPLE 3

Test rods consisting of flat rods of copper, wrapped with four layers of half-way overlapping polyimide foil and a cover layer of a woven glass fabric were impregnated at room temperature in a vacuum with a mixture according to Test 4 (Example 2). Before impregnation, the viscosity of the reaction resin mixture was about 7 mPas at 23.5° C. After the impregnation, the test winding was taken to a heating oven at 130° C. With the same resin mixture, three large standard rods without inserts and a sheet 200×200×3 mm were cast as molded materials.

After about 80 minutes, the reaction resin mixture in the test rods and in the molds had gelled. After a total heating time of three hours at 130° C., the temperature was held for another twenty-four hours at 180° C. and finally, another twenty-four hours at 200° C. The mechanical and electrical property values of the molding materials are shown in Table 2. Saturation of the insulating sleeves of the test rods was good.

TABLE 2

| $T_M$ (Martens temperature) | 220° C. |
|---|---|
| Bending strength | 150 N × mm$^{-2}$ |
| Impact bending strength | 11 mm Nmm$^{-2}$ |
| tan ζ at 50 Hz = f (ζ): | 0.0005 (100° C.) |
| | 0.0004 (150° C.) |
| | 0.0005 (200° C.) |

EXAMPLE 4

A filler-containing reaction resin with the composition:
100 g pure isomer mixture of the diphenylmethanediisocyanate
25 g bisphenol-F-diglycidyl ether
25 g styrene
227 g quartz meal (16900)
135 g silitin
0.925 g BCl$_3$.dimethylbenzylamine exhibits the following viscosity increase over time at 50° C.:

| Initial value | After 5 hrs | After 10 hrs | After 30 hrs |
|---|---|---|---|
| 1290 | 1420 | 1620 | 3200 mPas |

It is subjected to the following hardening sequence for the manufacture of molding materials:
8 hours at 80° C.
6 hours at 150° C.
16 hours at 200° C.

The hardened molding materials exhibit the following mechanical properties:

| Bending strength | 115 ± 15 N mm$^{-2}$ |
|---|---|
| Impact bending strength | 9 ± .?. mm N mm$^{-2}$ |
| Martens temperature $T_M$ | >220° C. |

EXAMPLE 5

A filler free-reaction resin, with the composition:
100 g pure isomer mixture of diphenylmethanediisocyanate
25 g bisphenol-F-diglycidyl ether
25 g styrene
0.925 g BCl$_3$.dimethylbenzylamine exhibits the following viscosity increase over time at room temperature (25° C.):

| Initial value | After one week | After two weeks |
|---|---|---|
| 11.7 | 14.2 | 25.6 mPas |

The following hardening is performed for the manufacture of molding materials:
8 hours at 80° C.
6 hours at 150° C.
16 hours at 200° C.

The hardened molding materials exhibit the following properties:

| $T_M$ (Martens temperature) | 177° C. |
|---|---|
| Bending strength | 149 N × mm$^{-2}$ |
| Impact bending strength | 11 mm N mm$^{-2}$ |

What is claimed is:

1. A heat-hardenable reaction resin mixture for impregnating insulation on electric equipment comprising a polyisocyanate, a polyepoxy resin, at least one olefinically unsaturated compound having no active hydrogen atoms, and an accelerator comprising an addition complex of a tertiary amine and boron trichloride having general formula $$BCl_3.NR_1R_2R_3$$

where $R_1$, $R_2$ and $R_3$ are the same or different aliphatic, aromatic, heterocyclic or aryl-aliphatic radicals.

2. The heat-hardenable reaction resin mixture according to claim 1, wherein the radicals $R_1$, $R_2$ and $R_3$ or two thereof are bound to each other in addition to the tertiary amine nitrogen atom.

3. The heat-hardenable reaction resin mixture according to claim 1, wherein the tertiary nitrogen atom is incorporated into a ring system which contains multiple bonds and may have an aromatic character and in this case $R_1$, $R_2$, and $R_3$ are combined to a trivalent organic radical which is bound to the tertiary nitrogen via a simple-C and double-C bond.

4. The heat-hardenable reaction resin mixture according to claim 1, wherein there is about 0.01 to 5.00 percent by weight accelerator.

5. The heat-hardenable reaction resin mixture according to claim 1, wherein there is about 0.05 to 2.50 percent by weight accelerator.

6. The heat-hardenable reaction resin mixture according to claim 5, further comprising a polymerization inhibitor in a concentration of about 0.001 to 2.00 percent by weight.

7. The heat-hardenable reaction resin mixture according to claim 6, wherein the concentration of inhibitor is about 0.0005 to 0.5000 percent by weight.

8. The heat-hardenable reaction resin mixture according to claim 1, wherein the accelerator is an addition complex of the boron trichloride with dimethyloctylamine.

9. The heat-hardenable reaction resin mixture according to claim 1, wherein the accelerator is an addition complex of the boron trichloride with dimethylbenzylamine.

10. The heat-hardenable reaction resin mixture according to claim 6, wherein the inhibitor is quinhydrone.

* * * * *